Feb. 13, 1968     R. E. TEMPLETON     3,368,823
MEANS FOR CONVERTING A BICYCLE TO A TRICYCLE
Filed May 26, 1966     4 Sheets-Sheet 1
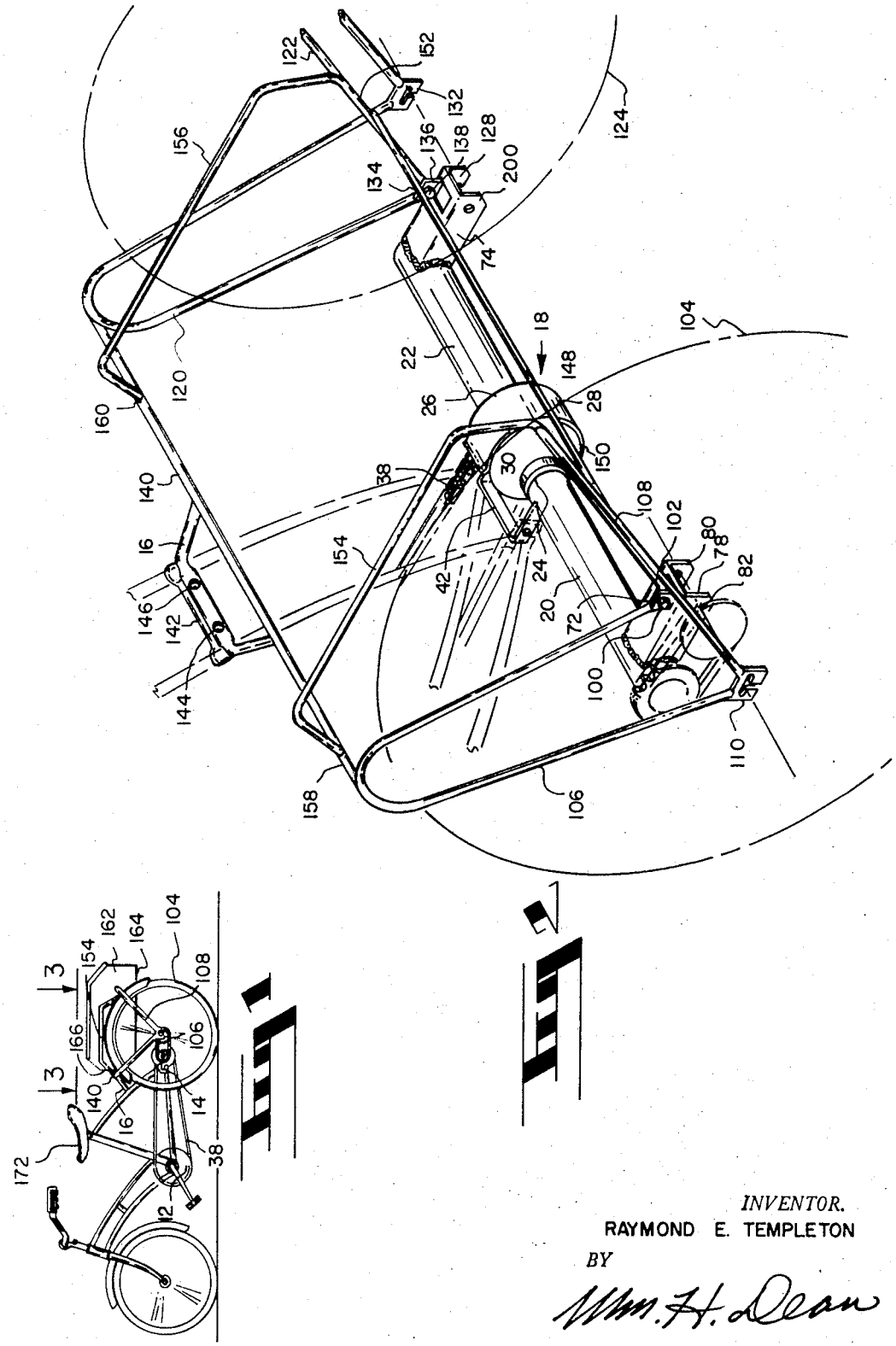
INVENTOR.
RAYMOND E. TEMPLETON
BY
Wm. H. Dean

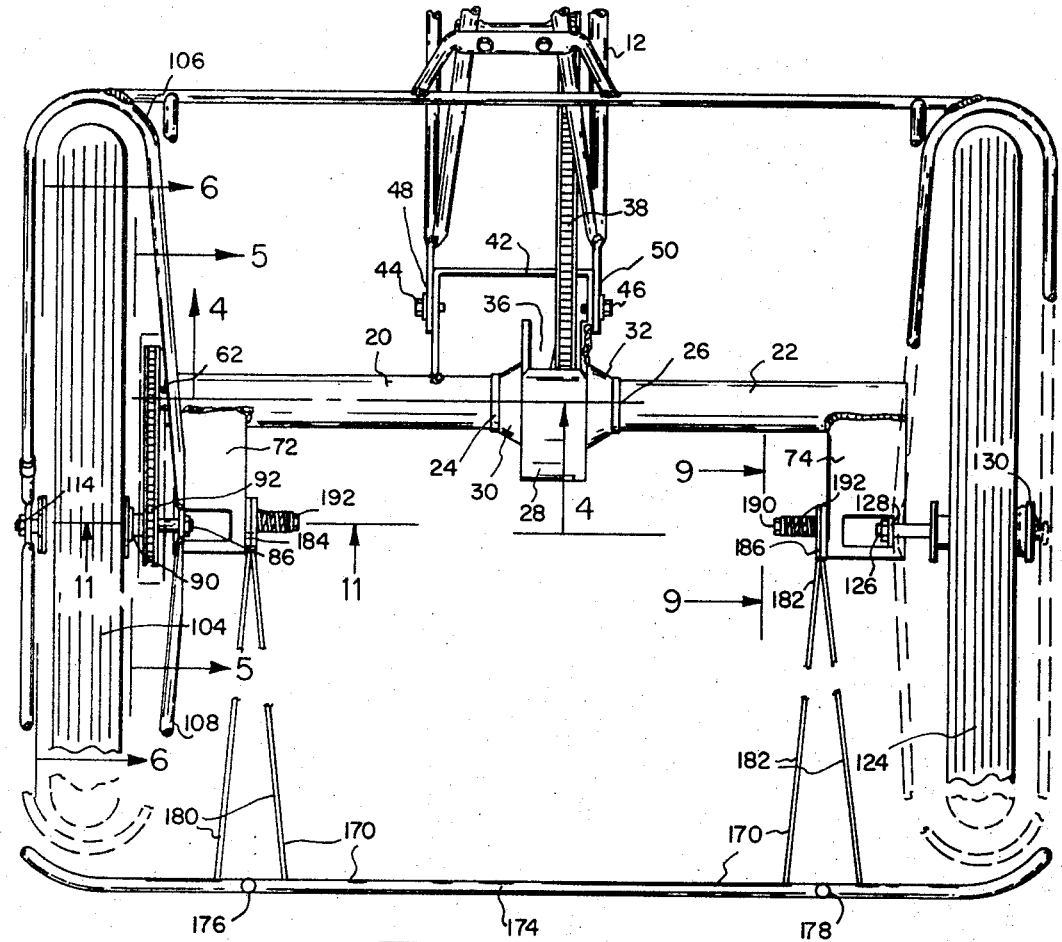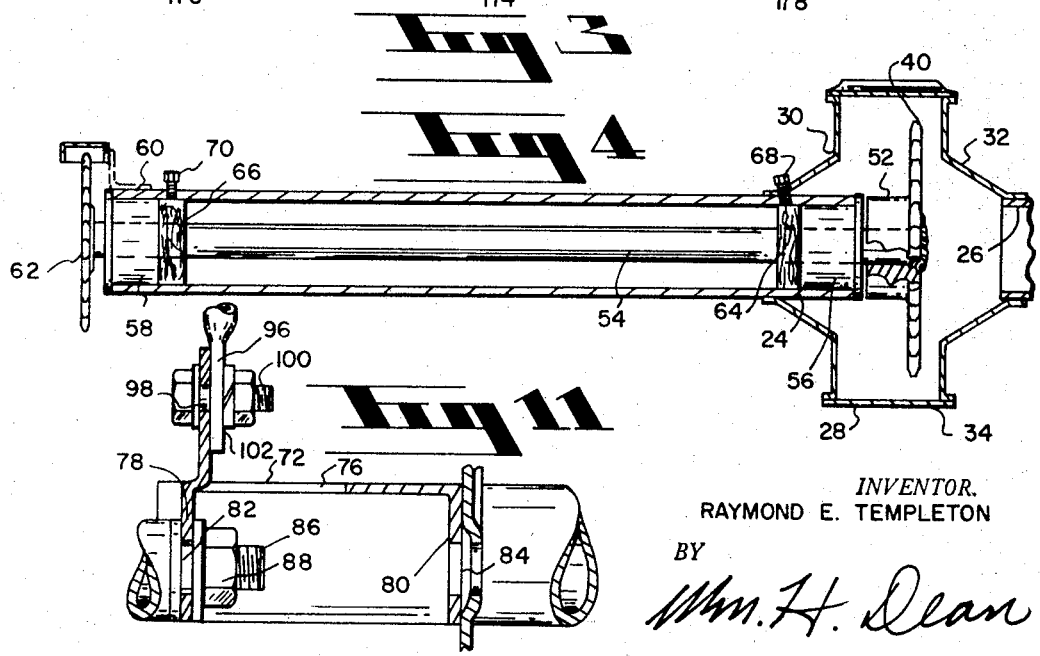

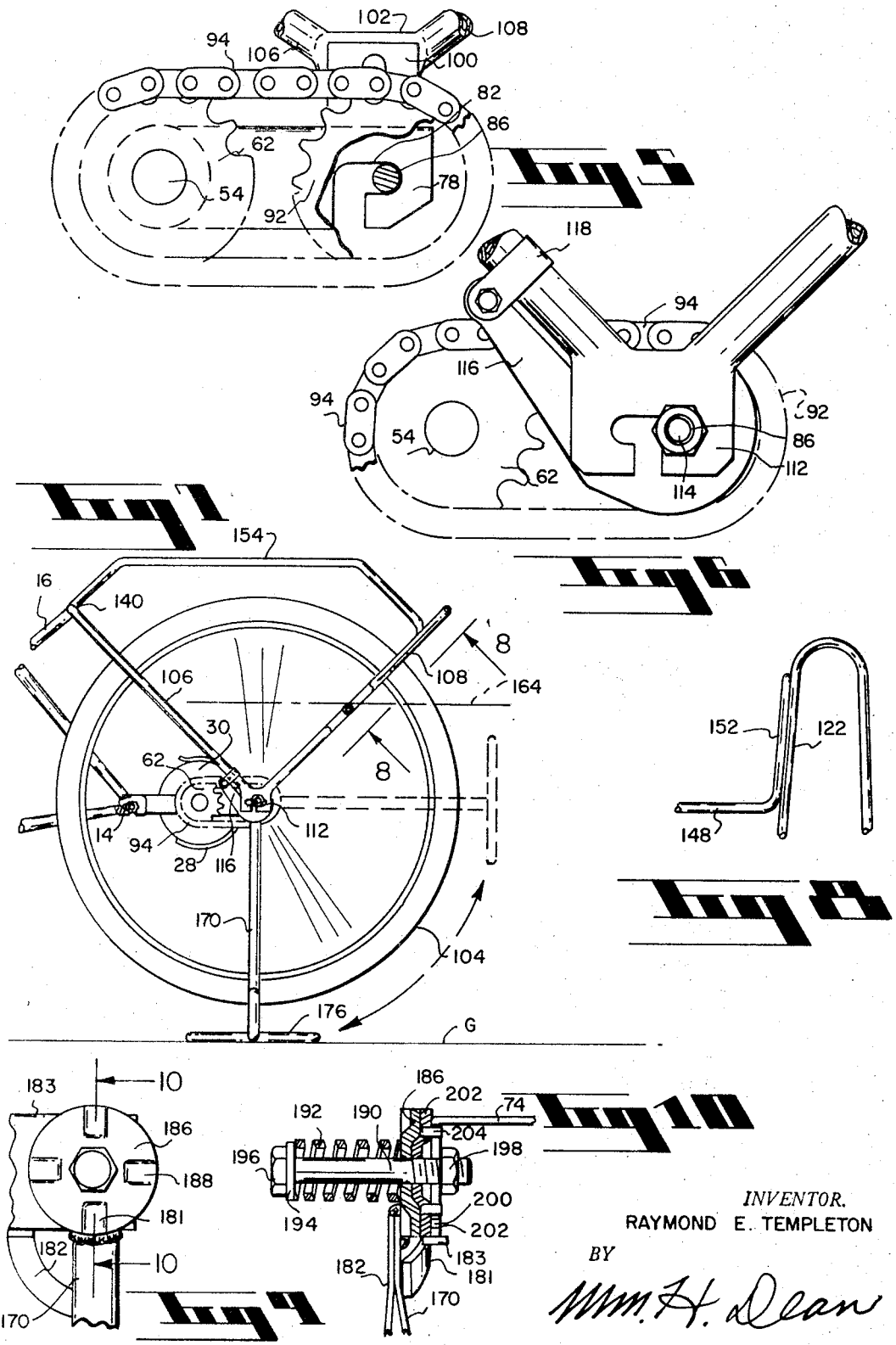

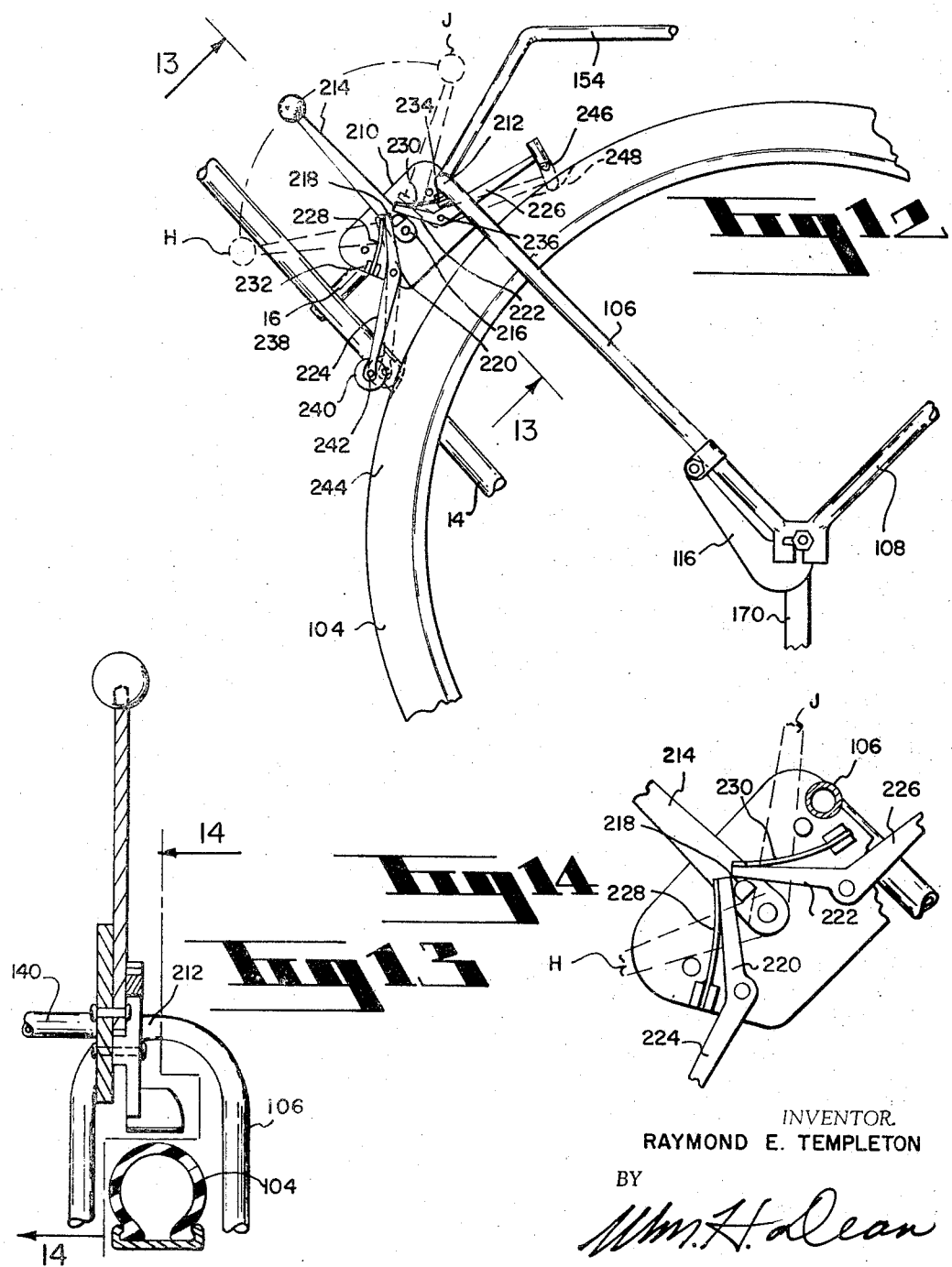

United States Patent Office 3,368,823
Patented Feb. 13, 1968

3,368,823
MEANS FOR CONVERTING A BICYCLE
TO A TRICYCLE
Raymond E. Templeton, Rte. 2, Box 766,
Peoria, Ariz. 85345
Filed May 26, 1966, Ser. No. 553,149
11 Claims. (Cl. 280—7.15)

This invention relates to a means for converting a bicycle to a tricycle, and more particularly, to improvements in a conversion frame and drive means for tricycles which have been converted from a bicycle.

Some prior art conversion devices for bicycles which have been used to convert such bicycles to tricycles are difficult to service in the event it is necessary to change a tire or to repair the coaster brake or drive mechanism of the tricycle. As for example, such mechanism requires that a considerable degree of disassembly of the entire vehicle must be resorted to in order to change a tire on the drive wheel of the tricycle and, also, to make repairs in the coaster brake or in the drive mechanism. Additionally, in such construction, the sprocket of the coaster brake is secured directly to a flange of driving axle and this arrangement dictates that such mechanism must be completely disconnected before a tire on the coaster brake wheel may be repaired or replaced.

Accordingly, it is an object of the present invention to provide a means for converting a bicycle to a tricycle, wherein very simple coaster brake wheel driving and supporting mechanism permits efficient driving and braking operations with respect to the coaster brake wheel and, further, affords a very simple means for removing the coaster brake wheel without considerable dismantling operations being performed on other structures of the tricycle.

Another object of the invention is to provide a novel conversion frame mechanism for converting a bicycle to a tricycle, whereby a very stabile widespread stand, is readily and easily moved from a horizontal position to a vertical position so as to support the two rear wheels of the tricycle in disengaged or elevated relation with the surface of the ground, such that a person may obtain normal pedal driving exercise when sitting on the tricycle and while remaining in a stationary condition.

Another object of the invention is to provide a novel exercising mechanism for use in connection with bicycles or tricycles, said mechanism comprising a stand to support a driving wheel of a respective vehicle, such as a bicycle or tricycle above the ground and a braking device engageable with the wheel to impose resistance to rotation of the wheels, such that a person sitting on the vehicle and pedaling to rotate the rear wheel must exert sufficient force to overcome the braking action imposed thereon.

Another object of the invention is to provide a novel braking mechanism for bicycles or tricycles which is adapted either to set the driving wheels thereof or to impose resistance to the rotation thereof, such that a person may obtain exercise by placing the vehicle on a stand and pedaling to drive the driving wheel during the imposition of braking force thereof.

Another object of the invention is to provide a novel braking mechanism for bicycles or tricycles, wherein a lever may alternately be moved in two different directions for actuating a wheel setting brake or for actuating a wheel drag brake which imposes braking force tending to resist rotation of the driving wheel.

Another object of the invention is to provide a means for converting a bicycle to a tricycle, wherein very simple, economical, durable and easy to service mechanism is afforded.

Further objects and advantages of the invention may be apparent from the following specification, appended claims and accompanying drawings, in which:

FIG. 1 is a side elevational view of a tricycle showing a means for converting a bicycle to a tricycle, in accordance with the present invention;

FIG. 2 is an enlarged perspective view of a means for converting a bicycle to a tricycle, in accordance with the present invention, and illustrating by broken lines a fragmentary portion of a conventional bicycle frame and the outline of wheels attached to the means of the invention;

FIG. 3 is a plan view of the means shown in FIG. 2 and illustrating portions of the structure fragmentarily to facilitate the illustration and showing a stand mechanism in addition to the structure disclosed in FIG. 2 of the drawings;

FIG. 4 is an enlarged fragmentary sectional view taken from the line 4—4 of FIG. 3, showing parts and portions in elevation to facilitate the illustration;

FIG. 5 is an enlarged fragmentary sectional view taken from the line 5—5 of FIG. 3;

FIG. 6 is an enlarged fragmentary sectional view taken from the line 6—6 of FIG. 3;

FIG. 7 is a fragmentary side elevational view of the means of the invention, showing it connected to the rear wheel fork structure of a conventional bicycle and illustrating varying positions of the stand mechanism of the invention;

FIG. 8 is a fragmentary sectional view taken from the line 8—8 of FIG. 7;

FIG. 9 is an enlarged fragmentary elevational view taken from the line 9—9 of FIG. 3;

FIG. 10 is a fragmentary sectional view taken from the line 10—10 of FIG. 9;

FIG. 11 is an enlarged fragmentary sectional view taken from the line 11—11 of FIG. 3;

FIG. 12 is a fragmentary side elevational view similar to FIG. 7, but showing the structure of the invention on enlarged scale and illustrating a braking mechanism in connection therewith;

FIG. 13 is an enlarged fragmentary sectional view taken from the line 13—13 of FIG. 12; and FIG. 14 is a sectional view taken from the line 14—14 of FIG. 13.

As shown in FIG. 1 of the drawings, a conventional bicycle frame 12 is provided with conventional rear wheel connection forks 14 to which the means of the invention is connected. Additionally, a coupling means 16 is connected with the rear wheel forks or bicycle frame above the wheel connection fork portions 14.

As shown in FIGS. 2, 3 and 4 of the drawings, the invention comprises a conversion frame 18, including a pair of hollow tubular axle members 20 and 22, having respective inner end portions 24 and 26 connected to a yoke structure 28. This yoke structure 28 is provided with a pair of substantially bell-shaped members 30 and 32 to which the respective hollow tubular members 20 and 22 are connected at their respective inner ends 24 and 26.

A substantially semi-circular member 34 surrounds the bell-shaped members 30 and 32 and is welded thereto in a substantially semi-circular form to enclose the rear side of the yoke 28 and to provide an opening 36 at the front side of the yoke structure 28 through which the conventional bicycle drive chain 38 extends into an engaged relation with a sprocket 40 disposed in the area of the yoke structure between the bell-shaped members 30 and 32. A connecting bracket 42 of substantially U-shaped configuration is fixed to the hollow tubular member 20 and to the bell 32, this bracket is provided with openings through which bolts 44 and 46 extend, said bolts also extending through respective connection portions 48 and 50 of conventional fork structures 14 of the bicycle frame 12, as shown best in FIGS. 1 and 3 of the drawings.

The sprocket 40 is provided with a hub 52 which is removably fixed by a bolt or otherwise to an axle 54 which is journaled in a bearing 56 carried in the inner end of the hollow tubular member 24. A similar bearing 58 is carried in an outer end 60 of the hollow tubular member 20 and a sprocket 62 is fixed on the outer end of the shaft 54, all as shown best in FIG. 4 of the drawings.

Oil retainers 64 and 66 are disposed in surrounding relation with the axle 54 and adjacent to the respective bearings 56 and plug screws 68 and 70 extend through the hollow tubular member 20 into proximity of the oil retainers 64 and 66 for affording access to the oiling of the retainers.

Secured to the hollow tubular members 20 and 22 near their outer ends are respective brackets 72 and 74. These brackets are substantially identical with each other except that they are left and right, respectively.

These brackets extend rearwardly from the hollow tubular members 20 and 22 and are substantially channel-shaped in cross-section, as shown in FIG. 11 of the drawings. Each bracket comprising a central web portion 76 which is horizontally disposed and a pair of vertically disposed flanges 78 and 80. These flanges are provided with openings 82 and 84, respectively. The openings 82 being disposed to receive a stub end 86 of a standard coaster brake axle, whereby a nut 88 screw threaded thereon fixes one end of a standard coaster brake 90, shown in FIG. 3 of the drawings, to the vertical flange 78 of the respective bracket.

The standard coaster brake 90 is provided with the standard sprocket 92, shown in FIGS. 3 and 5. A chain 94 engages this sprocket 92 and the sprocket 62 on the shaft 54.

Each web 76 of each of the brackets 72 and 74 is provided with a stuck out portion 96 which is disposed vertically and provided with an opening 98 therein through which a bolt 100 is disposed. This bolt 100 also extends through a connection portion 102 of a pair of forks which straddle the rear coaster brake wheel 104, as shown in FIG. 3 of the drawings. The pair of forks comprises a forward fork 106 and a rearward fork 108 which are disposed at an angle with each other about the axis of the bolt 86, also shown in FIGS. 2 and 5 of the drawings. The forks 106 and 108 at an outer side of the coaster brake wheel are provided with a connection portion 110 having a slotted opening 112 therein through which an opposite end 114 of the bolt 86 is secured. Thus, the connection portion 110 and the straddling forks 106 and 108 support the outboard end 114 of the axle 86.

As shown in FIG. 6 of the drawings, the connection portion 112 is disposed adjacent to a conventional torque reaction arm 116 of the coaster brake 90 and a band 118 secures the outboard end of the arm 116 to one side portion of the fork 106.

Referring now to FIGS. 2 and 3 of the drawings, it will be seen that the right hand side of the conversion frame of the invention, includes a pair of forks similar to the forks 106 and 108. This pair of forks being designated 120 and 122, respectively, which straddle a substantially conventional bicycle front wheel 124 having an inner end of this axle 126 secured to a downwardly extending flange 128 of the bracket 74. This downwardly extending flange being similar to the flange 78, hereinbefore described.

An outer end 130 of the front wheel axle is connected to a connection portion 132 of the pair of forks 120 and 122, said connection portion 132 being similar to the hereinbefore described connection portion 112. Both the connection portions 112 and 132 are provided with substantially T-shaped slotted openings to permit fore and aft adjustment of the axles, as well as vertical removal therefrom, these T-shaped slots being open at the bottom of the connection portions 112 and 132, all as shown best in FIGS. 2 and 6 of the drawings.

A connection portion 132 of the forks 102 and 122 disposed at the inner side of the conventional front wheel 124 is secured to an upstanding tab 136 by a bolt 138. This tab 136 is similar to the hereinbefore described tab 96, shown in FIG. 11 of the drawings.

A cross bar 140 interconnects the forward fork portions 106 and 120 of the two pairs of forks and the coupling 16, as shown in FIG. 1 of the drawings, extends forward of the bar 140 and is provided with a clamp plate 142 adapted to be clamped on the forward portion of the rear fork portions of the conventional bicycle frame 12 above the rear wheel connection portion thereof. This clamp structure 140 comprises bolt openings 144 and 146 through which bolts may be inserted and secured to clamp the coupling 16 to the rearward portion of a bicycle frame, all as shown best in FIG. 1 of the drawings.

A rearward cross bar 148, shown in FIGS. 2 and 7 of the drawings, is omitted in FIG. 3 of the drawings, in order to facilitate FIG. 3, for the purpose of showing other structure. However, this cross bar 148 is provided with portions 150 and 152 which are parallel with portions of the forks 108 and 122 and these parallel portions are fixed to these forks 108 and 122 integral with the parallel portions of fore and aft bar portions 154 and 156 which are connected at 158 and 160 with the forward cross bar 140. It will be seen that the forward cross bar, as shown in FIG. 7, is substantially above the rearward cross bar 148, such that a basket or pickup box 162 at its lower side 164 may be supported on the cross bar 148 and that the forward portion of this box, designated 166, may be closely adjacent to the forward cross bar 140.

It will be appreciated by those skilled in the art that the two pairs of forks straddling the two wheels 104 and 124 together with the cross bars 140 and 148, the coupling 16 and the bars 154 and 156 provide a very rigid frame for holding the outboard ends of the wheel axles while the inner ends of the axles are secured to the flanges 78 and 128 of the brackets 72 and 74, respectively.

A stand 170, shown in FIGS. 3, 7, 9 and 10, is provided for the purpose of supporting the wheels 104 and 124 above the surface of the ground so that a person may sit on the seat 172 of the bicycle, shown in FIG. 1, and operate the pedals in the conventional manner to obtain exercise without moving the bicycle. Additionally, the stand 170 may be used to hold the vehicle in stationary position or in parked position, as desired.

This stand 170 is provided with a horizontal cross bar 174 having secured thereto fore and aft lateral bars 176 and 178. These bars are adapted to rest on the ground. Extending upwardly from the bar 174 are two pairs of bars, one pair being designated 180 and the other pair being designated 182, as shown in FIG. 3 of the drawings. Upper ends of the pair 180 are secured to a detent disc 184 and upper ends of the pair 182 are secured to a detent disc 186.

Reference is now made to FIGS. 9 and 10 of the drawings, wherein the detent disc 186 is shown. This disc 186 is similar to the disc 184 and a description of the detent mechanism in connection with the detent disc 186 will be presumed to describe the mechanism connected with the detent disc 184. These detent structures are disposed in connection with the brackets 72 and 74, as shown in FIG. 3 of the drawings.

The detent disc 186 is provided with offset detent portions 188 disposed substantially 90° apart. A bolt 190 extends through the disc 186 and a spring 192 surrounds the bolt 190 and bears at its one end against a washer 194 adjacent a head 196 of the bolt. The opposite end of the bolt is provided with a screw threaded nut 198 which bears against a downwardly directed flange 200 of the bracket 74, said flange 200 being similar to the hereinbefore described flange 84, shown in FIG. 11.

Disposed between the flange 200 and the detent member 186 is a secondary detent member 202 having conforming detent portions which conform with the detent elements 188 disposed substantially 90° apart. Pins 204 of the detent member 202 extend into openings in the flange 200 to prevent the detent member 202 from rotating relative to the flange 200. Thus, when the stand 170 is rotated about the axes of the bolts 190, the detent plates 186 move relative to the plates 202 and compress the springs 192 and tend to rotate the detent plate 202. However, the pins 204 hold them fixed relative to the flange 200 and, thus, the stand 170 may be held in either horizontal position, as indicated by broken lines in FIG. 7 of the drawings, or may be disposed in the solid line position, as shown therein, for holding the wheels 104 and 124 above the surface G of the ground or any other surface on which the vehicle is disposed. In this position, the vehicle may be used, as hereinbelow described, such that a person may exercise in his own home without traveling on the vehicle. This may be advisable or desirable during inclement weather or may be utilized, such as a matter of routine.

As shown in FIGS. 9 and 10 of the drawings, the bracket 182 of the stand 170 is provided with a stop member 181, which engages a lower surface 183 of the channel flange 200 when the stand is in the position, as shown in FIGS. 7, 9 and 10. Likewise, the bracket portion 184 of the stand 170 is provided with a similar stop for limiting forward pivotal movement of the stand 170.

As shown in FIGS. 12, 13 and 14, a braking mechanism of the present invention serves to either lockingly engage the periphery of the driving wheel 104 or to provide for braking or drag resistance at the periphery of the wheel, such that when the vehicle is on the stand 170 in the position, as shown in FIGS. 7 and 12, that a person may attain exercise, as will be hereinafter described.

Referring specifically to the mechanism shown in FIGS. 12, 13 and 14, it will be seen that a plate member 210 is secured to an upper portion 212 of the fork 106 and that a brake control lever 214 is pivoted on a pin 216 carried by the plate 210. Fixed to the lever 214 in spaced relation to the axis of the pivot 216 is a cam 218 adapted to engage cam surfaces 220 and 222 of braking levers 224 and 226, respectively. Plate springs 228 and 230 fixed at 232 and 234 on the plate 210 bear against opposite sides of the levers from their cam portions 220 and 222, respectively, tending to hold them in engagement with the cam 218 and to hold the lever 214 in the solid line position, as shown in FIG. 12.

The lever 226 is pivoted on a pin 236 carried by the plate 210, while the lever 224 is pivoted on a pin 238 carried by the plate 210. The lever 224 carries a roller 240 which is pivotally mounted on a pin 242 on the extended end of the lever 224, the roller 240 being adapted to be moved into engagement with the periphery 244 of the tire of the wheel 104. The lever 226 is provided with a locking dog 246 adapted to be compressed into the periphery 224 of the wheel at 248 for positively restraining rotation of the wheel 104.

In operation, of the structure shown in FIGS. 12, 13 and 14, the tricycle or a bicycle may be supported by the stand 170 or a conventional stand, as may be desired, such that the rear wheel or the driving wheel 104 is above the surface G of the ground, as shown in FIG. 7. Then the lever 214 may be pressed forward into a broken line position H, as shown in FIG. 12, whereupon the cam 218 engages the surface 220 of the lever 224 and forces it against resilient action of the spring 228, such that the roller 240 is slightly indented into the periphery 244 of the resilient rubber tire of the wheel 104. This creates a slight braking movement at the periphery of the wheel 104, such as to create rotational drag about the axis of the wheel 104 to thus permit a person applying rotational force to the wheel 104 to obtain exercise while the bicycle or tricycle is on the stand 170.

With reference to FIG. 1 of the drawings, it will be seen that a person may sit on the seat 172 of the invention, as shown, and the stand, as shown in FIGS. 7 and 12, may support the wheel 104 above the surface of the ground, as hereinbefore described, and the person sitting on the vehicle may obtain exercise while the vehicle is in stationary position. This facility affords home exercise without traveling and within the privacy of the home.

The braking mechanism, shown in FIGS. 12, 13 and 14, has an alternate usage primarily the positive braking action provided by the dog 246, when actuated by the lever 214. When the lever 214 is moved into the position J, shown in FIG. 12 of the drawings, the cam 218 engages the cam surface 222 of the lever 226 and forces the dog 246 to substantially indent the periphery 244 of the tire of the wheel 104, as indicated by broken lines 248. This positively holds the wheel 104 against rotation and may serve as a parking brake, such that the vehicle of the invention may be parked on a steep incline without danger of rolling away.

It will be appreciated by those skilled in the art, that the surface of the cam 218, as shown in FIG. 14, reaches a substantially overcenter position with respect to the surface 220 and the surface 222 of the levers 224 and 226 when the lever 214 is moved into either the broken line position H or broken line position J.

It will be appreciated that the springs 228 and 230 tend to force the cam portions 220 and 222 of the levers 224 and 226, respectively, into engagement with the cam 218, such as to hold the lever 214 in the solid line position, as shown in FIGS. 12 and 14, and in this position, the roller 240 and the dog 246 are held in spaced and released position relative to the periphery 244 of the wheel 104.

The maintenance and servicing of the invention may be readily and easily accomplished due to the slotted openings 82 and 112 in the flange 78 and in the fork fixture 110. Further, it will be understood that the short chain 94 permits the coaster brake wheel to be moved and pivoted downwardly and then slightly forward to relieve the chain from the sprockets, namely, the chain 94. Likewise, the wheel 122 may be very easily removed from like fixtures and slotted openings in the flanges 128 and the fixture 132, as hereinbefore described. Thus, the wheels in connection with applicant's invention, may readily be removed for service, replacement of tires, straightening or for other reasons. The remaining structure of the invention is very simple and durable and may remain in connection with the frame of the bicycle during all other service functions or repairs thereto.

It will be obvious to those skilled in the art that various modifications of the present invention may be resorted to in a manner limited only by a just interpretation of the following claims.

I claim:

1. In a means for converting a bicycle to a tricycle the combination of: a conversion frame having a pair of axially aligned tubular members provided with adjacent inner ends spaced apart; a yoke means rigidly interconnecting said inner ends of said tubular members; a connecting bracket means secured to said frame in the proximity of said yoke and extending forwardly and adapted to be secured to conventional rear wheel connecting forks of a bicycle, said tubular members having outer ends; wheel supporting brackets secured to said tubular members near their outer ends, said brackets extending in a direction laterally with respect to the axis of said tubular members; a conventional rear bicycle wheel having a conventional hub; said hub having a conventional drive sprocket and a conventional axle; said axle at its end near said sprocket connected to one of said brackets; a conventional bicycle front wheel having a conventional axle connected to another of said brackets; a shaft journaled in said one of said tubular members; second and third sprockets fixed to opposite ends of said shaft; said second sprocket disposed in an area of said yoke and adapted to be engaged by conventional bicycle drive chain; said third sprocket being disposed beyond the outer end of said one tubular member; and a second drive chain operably connecting said third sprocket and said conventional drive sprocket.

2. The invention as defined in claim 1, wherein: said brackets are extended rearwardly from said tubular members.

3. The invention as defined in claim 1, wherein: said brackets are of inverted channel-shaped cross-section, said cross-section comprising a topmost horizontal web portion and a pair of first and second spaced downwardly extending flange portions integral with said web portion.

4. The invention as defined in claim 3, wherein: each of said first flange portions is disposed near a respective outer end of one of said tubular members and said second flange portions are disposed a short distance inwardly from said outer ends and said first flange portions, said coaster brake axle and said front wheel axle being connected to said first flanges.

5. The invention as defined in claim 4, wherein: a stand is pivoted to and between said second flanges; said stand having a base portion and being longer from its base portion to its pivotal connection than the radii of said wheels.

6. The invention as defined in claim 5, wherein: detent means are secured to said second flanges for holding said stand in either substantially vertical position or horizontal position.

7. The invention as defined in claim 1, wherein: an auxiliary frame assembly comprises two pairs of forks; each pair having a forward fork and a rearward fork; the forks of each pair straddling one of said wheels and fixed together and to one of said axles at one side of a respective wheel; each fork of each pair disposed at an angle to the other fork of each pair about the respective wheel axis; a first cross bar interconnecting the forward forks of both pairs; and coupling means carried by said first cross bar and adapted to be connected with a conventional bicycle frame above the rear wheel connection portions thereof.

8. The invention as defined in claim 7, wherein: a second cross bar interconnects said rearward forks of both pairs of forks.

9. The invention as defined in claim 8, wherein: a brace bar interconnects each forward and rearward fork of each pair of forks.

10. The invention as defined in claim 9, wherein: said brace bars are fixed to said first and second cross bars.

11. The invention as defined in claim 3, wherein; an auxiliary frame assembly comprises two pairs of forks, each pair having a forward fork and a rearward fork, the forks of each pair straddling one of said wheels and fixed together and to one of said axles at one side of a respective wheel; each fork of each pair disposed at an angle to the other fork of each pair about the respective wheel axis; a first cross bar interconnecting the forward forks of both pairs; and coupling means adapted to be connected with the bicycle frame above the rear wheel connection portions of a conventional bicycle frame; and an upstanding tab structure on each of said brackets and disposed vertically; said forks of each pair having one straddling connection portion disposed at an inner side of one of said wheels, said last mentioned connection portion secured to a respective upstanding tab.

References Cited
UNITED STATES PATENTS

| | | | |
|---|---|---|---|
| 2,995,378 | 8/1961 | Whetstone | 280—7.15 |
| 3,229,988 | 1/1966 | Mansperger | 280—7.15 |
| 3,258,272 | 6/1966 | Hendricks | 280—7.15 |
| 3,258,273 | 6/1966 | Matthews | 280—7.15 |

LEO FRIAGLIA, *Primary Examiner.*

M. L. SMITH, *Assistant Examiner.*